United States Patent [19]

Sawyer

[11] Patent Number: 4,964,332
[45] Date of Patent: Oct. 23, 1990

[54] PISTON AND CONNECTING PIN ASSEMBLY, A CROSSHEAD AND CONNECTING PIN ASSEMBLY, AND A CONNECTING PIN ASSEMBLY

[75] Inventor: John A. Sawyer, Trout Run, Pa.

[73] Assignee: Dresser-Rand Company, Corning, N.Y.

[21] Appl. No.: 407,832

[22] Filed: Sep. 15, 1989

[51] Int. Cl.⁵ .............................................. F16J 1/14
[52] U.S. Cl. ....................................... 92/187; 92/165;
92/172; 92/216; 123/193 P; 403/154
[58] Field of Search ............... 92/139, 165, 172, 187,
92/216, 217, 219; 123/193 P; 403/154, 297, 322

[56] References Cited

U.S. PATENT DOCUMENTS

| | | | |
|---|---|---|---|
| 1,511,135 | 10/1924 | Moser | 403/154 |
| 2,192,484 | 3/1940 | Bryan | 403/322 |
| 2,343,719 | 3/1944 | Ulrich | 403/154 |
| 2,418,901 | 4/1947 | Read | 403/154 |
| 3,012,419 | 12/1961 | Dovey | 403/322 |
| 4,355,917 | 10/1982 | Bunger | 403/322 |
| 4,461,595 | 7/1984 | Mallas | 403/154 |
| 4,690,038 | 9/1987 | Klie et al. | 92/187 |

FOREIGN PATENT DOCUMENTS 490535  8/1938  United Kingdom ................ 92/216

Primary Examiner—Ronald C. Capossela
Attorney, Agent, or Firm—Bernard J. Murphy

[57] ABSTRACT

The pin assembly comprises a piston or crosshead connecting pin which has a throughgoing, axial hole formed therein which is tapped at one end to receive a headed fastener. Radial bores are formed in the connecting pin which bores open onto the axial hole and also onto the outer surface of the connecting pin. Locking pins are slidably disposed in the radial bores so that, as a headed fastener is threaded into the tapped end of the axial hole, the head of the fastener forces the locking pins to protrude from the radial bores and engage an annular groove, provided therefor, in the piston or crosshead.

10 Claims, 1 Drawing Sheet

PISTON AND CONNECTING PIN ASSEMBLY, A CROSSHEAD AND CONNECTING PIN ASSEMBLY, AND A CONNECTING PIN ASSEMBLY

This invention pretains to connecting pins, such as connect pistons or crossheads to connecting rods, and in particular to a novel connecting pin assembly, per se, and in combination with a piston, and in combination with a crosshead.

Connecting pins, i.e. those that connect pistons or crossheads to connecting rods are usually held in place with retaining rings set at opposite ends of the pin and/or with an interference fit in the bore or bores in the piston or crosshead.

Not infrequently, the dimensions of the piston or crosshead are such that there is insufficient bearing area for the connecting pin to accommodate end retaining rings. Too, the practice of using an interference fit is subject to the situation in which the pin comes loose, proceeds to migrate from its bore(s), and causes damage.

It is an object of this invention to set forth a connecting pin assembly which is not subject to loosening, and one which accommodates for the greatest possible pin bearing area.

Too, it is an object to disclose a connecting pin assembly, as aforesaid, in combination with a piston, and in combination with a crosshead.

It is particularly an object of this invention to set forth a connecting pin assembly comprising a connecting pin having (a) a longitudinal axis, and (b) a hole formed in one axial end therof; wherein said pin further has a radial bore formed therein which opens onto said hole, at one end of said bore, and externally of said pin, at the other, opposite end of said bore; a locking pin slidably disposed in said bore; and means engaged with said hole for moving said locking pin radially in said bore to cause said locking pin to project from said bore.

Further objects of this invention, as well as the novel features thereof will become more apparent by reference of the following description, taken in conjunction with the accompanying figures, in which.

Figure 2:
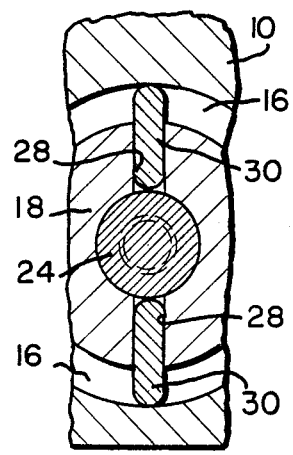
FIG. 2 is a cross-sectional view taken along section 2—2 of FIG. 1.
Figure 1:
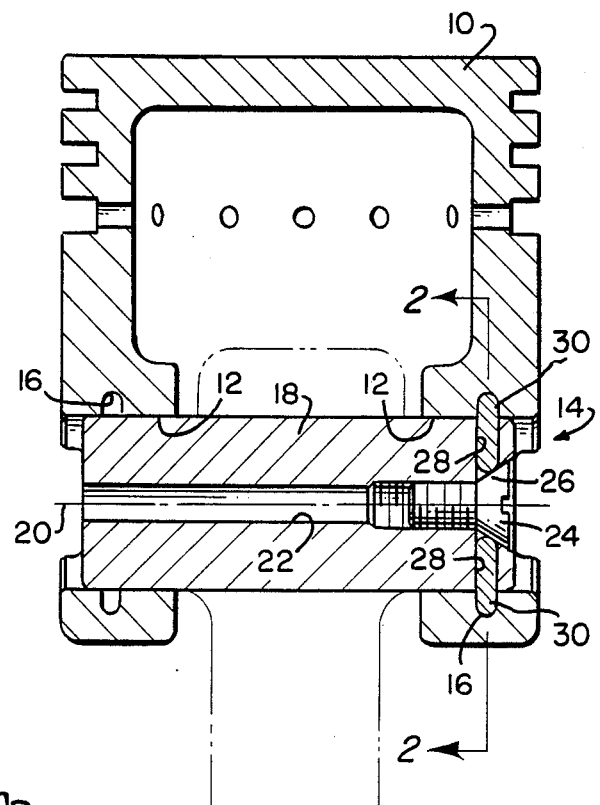
FIG. 1 is a cross-sectional view of a piston, and a phantomed connecting rod, showing the novel connecting pin assembly, according to an embodiment thereof, in combination therewith.

As shown in FIGS. 1 and 2, a piston 10 has a pair of in line bores 12 formed therein which receive the new connecting pin assembly 14. The bores 12 have annular grooves 16 formed thereabout. The pin assembly 14 comprises a pin 18 having a longitudinal axis 20 and, along the axis 20, is formed a throughgoing hole 22. One end of the hole 22 is tapped to receive a fastener 24. The outermost end of the hole 22 is countersunk to accommodate the tapered head 26 of the fastener 24.

Opening onto the hole 22, at one end thereof, and onto the groove 16 adjacent to the tapped end of the hole 22 are a pair of radial bores 28. Each bore 28 has a locking pin slidably engaged therewith. Consequently, as the fastener 24 is threaded into the tapped end of the hole 22, the tapered head of the fastener 24 causes the locking pins 30 to move, along the bores 28, and protrude into the aforesaid groove 16. The fastener 24 is torqued tightly into the hole 22, to prevent the locking pins 30 from slipping out of the groove 16 and, of course, the locking pins 30 secure the pin 18 in the bores 12.

Figure 3:
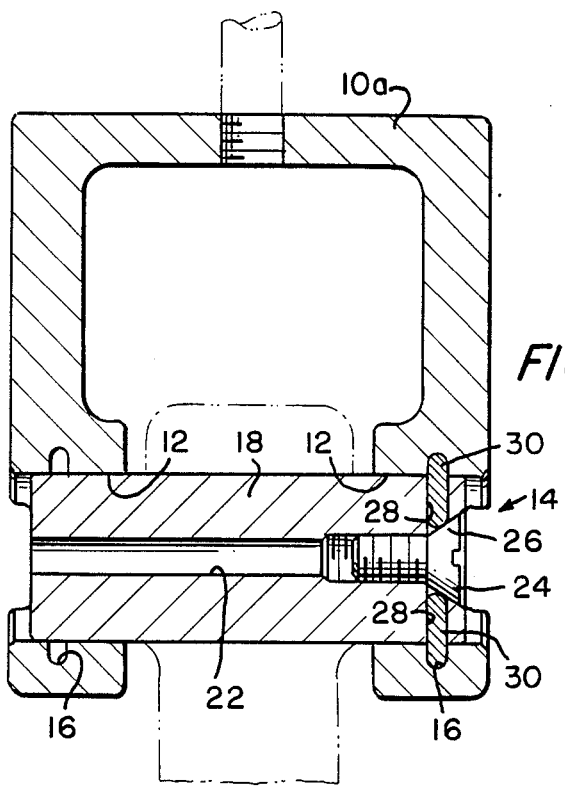
FIG. 3 is an illustration, substantially similar to that of FIG. 1 showing, however, the novel connecting pin assembly, in the same FIG. 1 embodiment, in combination with a crosshead.

In FIG. 3, where same or similar index numbers denote same or similar components or elements as in FIGS. 1 and 2, the novel connecting pin assembly 14 is shown in combination with a crosshead 10a. The crosshead 10a, like the piston 10 of FIGS. 1 and 2, attaches to a connecting rod shown only in phantom, and to a piston rod, also phantomed, as well.

While I have described by invention in connection with specific embodiments thereof, it is to be clearly understood that this is done only by way of example. In lieu of pins 30, it will be appreciated that spheres could be lodged in accommodating radial bores 28 for movement into grooves 16. Too, the pin 18 can be tapped at both ends to receive fasteners 24 in each end, and have locking pins 30 and radial bores 28 thereat to engage both of the grooves 16. These, and all other modifications of the invention, which will occur to others from may teaching, are deemed to be within the ambit of the invention and embraced by the appended claims.

I claim:

1. A connecting pin assembly, comprising:
   a connecting pin having (a) a longitudinal axis, (b) a hole formed in one axial end thereof; wherein
   said pin further has a radial bore formed therein which opens onto said hole, at one end of said bore, and externally of said pin, at the other, opposite ene of said bore;
   a locking pin slidably disposed in said bore; and
   a fastener engaged with said hole; wherein
   said fastener has means for moving said locking pin radially in said bore to cause said locking pin to project from said bore;
   said fastener has a drive head; and
   said drive head comprises said pin moving means.

2. A connecting pin assembly, according to claim 1, wherein:
   said hole is tapped; and
   said fastener is threaded.

3. A connecting pin assembly, according to claim 1, wherein:
   said hole is countersunk; and
   said drive head has a tapered surface.

4. A piston and connecting pin assembly, comprising:
   a piston having bores formed therein to receive a connecting pin, and an annular groove circumscribing one of said bores;
   a connecting pin having (a) a longitudinal axis, and (b) a hole formed in one axial end thereof, set in said bores; wherein
   said pin further has a radial bore formed therein which opens onto said hole, at one end of said bore, and externally of said pin onto said groove;
   locking means slidably engaged with said radial bore; and
   a fastener engaged with said hole; wherein
   said fastener has means for sliding said locking means, radially in said bore, for protrusion of said locking means into said groove;
   said fastener has a drive head; and
   siad drive head comprises said sliding means for said locking means.

5. A piston and connecting pin assembly, according to claim 4, wherein:
said locking means comprises a locking pin.

6. A piston and connecting pin assembly, according to claim 4, wherein:
said hole is tapped; and
said fastener is threaded.

7. A piston and connecting pin assembly, according to claim 4, wherein:
said hole is countersunk; and
said drive head has a tapered surface.

8. A crosshead and connecting pin assembly, comprising:
a crosshead having bores formed therein to receive a connecting pin, and an annular groove circumscribing one of said bores;
a connecting pin having (a) a longitudinal axis, and (b) a hole formed in one axial end thereof, set in said bores; wherein
said pin further has a radial bore formed therein which opens onto said hole, at one end of said radial bore, and externally of said pin, onto said groove, at the other, opposite end of said radial bore;
means slidably engaged with said radial bore for locking said pin in said bores; and
a fastener engaged withe said hole; wherein
said fastener has means for sliding said locking means, radially, in said radial bore, to cause said locking means to engage said groove;
said fastener has a drive head; and
said drive head comprises said sliding means for said locking means.

9. A crosshead and connecting pin assembly, according to claim 8, wherein:
said locking means comprises a locking pin.

10. A crosshead and connecting pin assembly, according to claim 8, wherein:
said hole is tapped; and
said fastener is threaded.

* * * * *